United States Patent [19]

Stutt et al.

[11] Patent Number: 4,701,939
[45] Date of Patent: Oct. 20, 1987

[54] METHOD AND APPARATUS FOR OBTAINING RELIABLE SYNCHRONIZATION OVER A NOISY CHANNEL

[75] Inventors: Charles A. Stutt, Rexford; Jagdish T. Gajjar, Clifton Park, both of N.Y.

[73] Assignee: General Electric Company, Schenectady, N.Y.

[21] Appl. No.: 718,266

[22] Filed: Apr. 1, 1985

[51] Int. Cl.⁴ .......................... H04L 1/00; H04L 7/04
[52] U.S. Cl. ...................................... 375/115; 371/42; 375/116
[58] Field of Search ........................ 371/70, 42, 46, 37; 375/111, 114, 116, 115, 1; 370/100, 105, 106, 92

[56] References Cited

U.S. PATENT DOCUMENTS

| | | | |
|---|---|---|---|
| 3,576,947 | 5/1971 | Kruger | 375/116 |
| 3,883,729 | 5/1975 | de Cremiers | 375/116 |
| 4,131,763 | 12/1978 | Herschtal | 370/100 |
| 4,267,595 | 5/1981 | Hernandez | 375/100 |
| 4,397,022 | 8/1983 | Weng et al. | 371/37 |
| 4,402,080 | 8/1983 | Mueller | 375/116 |
| 4,501,736 | 4/1986 | Dobyns | 370/92 |
| 4,547,887 | 10/1985 | Mui | 375/1 |

OTHER PUBLICATIONS

"Time Division Multiplexing", *Communications Systems*, Carlson, McGraw-Hill, 1975, pp. 330–331.

Primary Examiner—Benedict V. Safourek
Attorney, Agent, or Firm—Bernard J. Lacomis; James C. Davis, Jr.

[57] ABSTRACT

Method and apparatus for synchronizing a transmitter and a receiver in a synchronous serial transmission system by serially transmitting a plurality of pseudorandom, coded sync words in an interlaced fashion with corresponding bits of each word transmitted in sequence. At the receiver, received bits are first directed to a plurality of registers to undo the interlacing process and then decoded with the decoded word being compared by an autocorrelation technique to a known reference to thereby establish or reestablish synchronization between transmitter and receiver.

13 Claims, 5 Drawing Figures

11-BIT P-R SEQUENCE AND COMPLEMENT WITH E.P. BIT

| BIT No.:    | 1 | 2 | 3 | 4 | 5 | 6 | 7 | 8 | 9 | 10 | 11 | E.P. 12 |
|---|---|---|---|---|---|---|---|---|---|---|---|---|
| SEQUENCE:   | 1 | 1 | 1 | 0 | 0 | 0 | 1 | 0 | 0 | 1 | 0 | (1) |
| COMPLEMENT: | 0 | 0 | 0 | 1 | 1 | 1 | 0 | 1 | 1 | 0 | 1 | (0) |

AUTOCORRELATION OF P-R SEQUENCE

REFERENCE → 0 1 0 0 1 0 0 0 1 1 1    Σ (OUTPUT)

```
PROGRESSING
 SEQUENCE
0 1 0 0 1 0 0 0 1 1 1                  -1
  0 1 0 0 1 0 0 0 1 1 1                 0
    0 1 0 0 1 0 0 0 1 1 1              -1
      0 1 0 0 1 0 0 0 1 1 1             0
        0 1 0 0 1 0 0 0 1 1 1          -1
          0 1 0 0 1 0 0 0 1 1 1         0
            0 1 0 0 1 0 0 0 1 1 1      -1
              0 1 0 0 1 0 0 0 1 1 1     0
                0 1 0 0 1 0 0 0 1 1 1  -1
                  0 1 0 0 1 0 0 0 1 1 1  0
                    0 1 0 0 1 0 0 0 1 1 1  +11
```

AUTOCORRELATION OF P-R SEQUENCE

FIG. 3

BIT No. 1 ... 60 (E.P.)

FIVE INTERLACED AND ALTERNATELY COMPLEMENTED P-R SEQUENCES WITH 12TH E.P. BIT

BIT No. 61 ... 120 (O.P.)

INTERLACED GOLAY REDUNDANCY BITS FOR MESSAGE BITS OF FIG. 2A FROM GENERATING POLYNOMIAL 110001110101

METHOD AND APPARATUS FOR OBTAINING RELIABLE SYNCHRONIZATION OVER A NOISY CHANNEL

RELATED APPLICATION

This application is related to patent application Ser. No. 627,368, entitled "Apparatus and Method for Decoding Error Correction Coded Information", filed July 2, 1984, now U.S. Pat. No. 4,648,901 issued Mar. 3, 1987 assigned to the same assignee and incorporated herein in its entirety by reference.

BACKGROUND OF THE INVENTION

This invention relates to data communication and more particularly to obtaining reliable synchronization between a transmitter and a receiver over a noisy communication channel.

Synchronous methods of data transfer are often preferred when serial communication media are used because these methods permit higher throughput capability than asynchronous techniques. For proper functioning of synchronous systems, synchronization between a receiver and a transmitter is essential. When a communication system operates in a noisy environment, receiver synchronization is often lost due to noise. In order to permit the receiver to acquire and maintain synchronization with the transmitter, a commonly employed scheme periodically transmits binary synchronizing words including predetermined or pseudo random bit patterns. The receiver uses these synchronizing words to verify synchronization and to re-synchronize, if necessary. If the communication channel is noisy, synchronizing words may become corrupted, e.g., the transmitted bit pattern may be randomly altered, causing the receiver to lose synchronization and may ultimately result in failure to re-achieve it.

When noise characteristics of a communication medium are bursty, it is desirable to employ an interleaved message structure and forward error correction coding in order to overcome corruption of information due to noise. Further, it is also desirable to overcome corruption of synchronizing words due to noise and still achieve both bit and message synchronization and be able to re-acquire synchronization of the receiver after it has been lost.

In order to provide bounding, which gives an indication of where one message ends and the next message begins, it is often necessary to include delineation bits or code as part of the header and/or trailer along with the message being sent. Such bounding information contributes to overhead of the system in that it uses a portion of the available bandwidth which may be more efficiently allocated to intelligence data transmission.

Accordingly, it is an object of the present invention to provide a method and apparatus for bit and/or message synchronization.

Another object is to obtain accurate bit and/or message synchronization in a noisy environment, even if message bits are corrupted.

Yet another object is to provide a method and apparatus which permits rapid resynchronization after a receiver has lost synchronization with a transmitter.

SUMMARY OF THE INVENTION

In accordance with the present invention, a method for encoding and decoding information so as to be able to communicate over a noisy channel using block structured messages comprises transmitting a "no-op" or predetermined synchronizing word at predetermined intervals to permit both bit synchronization and message synchronization at a receiver. The method is particularly well suited to systems in which a plurality of remote receiver stations must be synchronized with respect to a single master transmitter station, especially those systems in which the electrical quality of transmission medium between the master station and respective remote stations may independently randomly vary. In the communications protocol, messages and no-op words are interlaced to enable remote stations to verify that synchronization is maintained and to resynchronize, if necessary, throughout communication contact with the transmitter. It is possible to achieve synchronization when bits in the synchronizing no-op word are corrupted due to noise or other unwanted disturbances by using a tracking decoder at receiver stations.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DESCRIPTION OF THE DRAWING

FIG. 3 is a diagram of an example of a pilot no-op message word in accordance with the present invention.

DETAILED DESCRIPTION

This invention relates to a method and apparatus for coding and decoding information which permits better synchronization of block structured messages in synchronous communication schemes operating in noisy environments. Message synchronization is improved in the presence of random and/or burst bit errors (multiple contiguous bit errors), such as may be caused by noise. Verifying synchronization and re-establishment of synchronization by the receiver may be readily effected.

Figure 1:
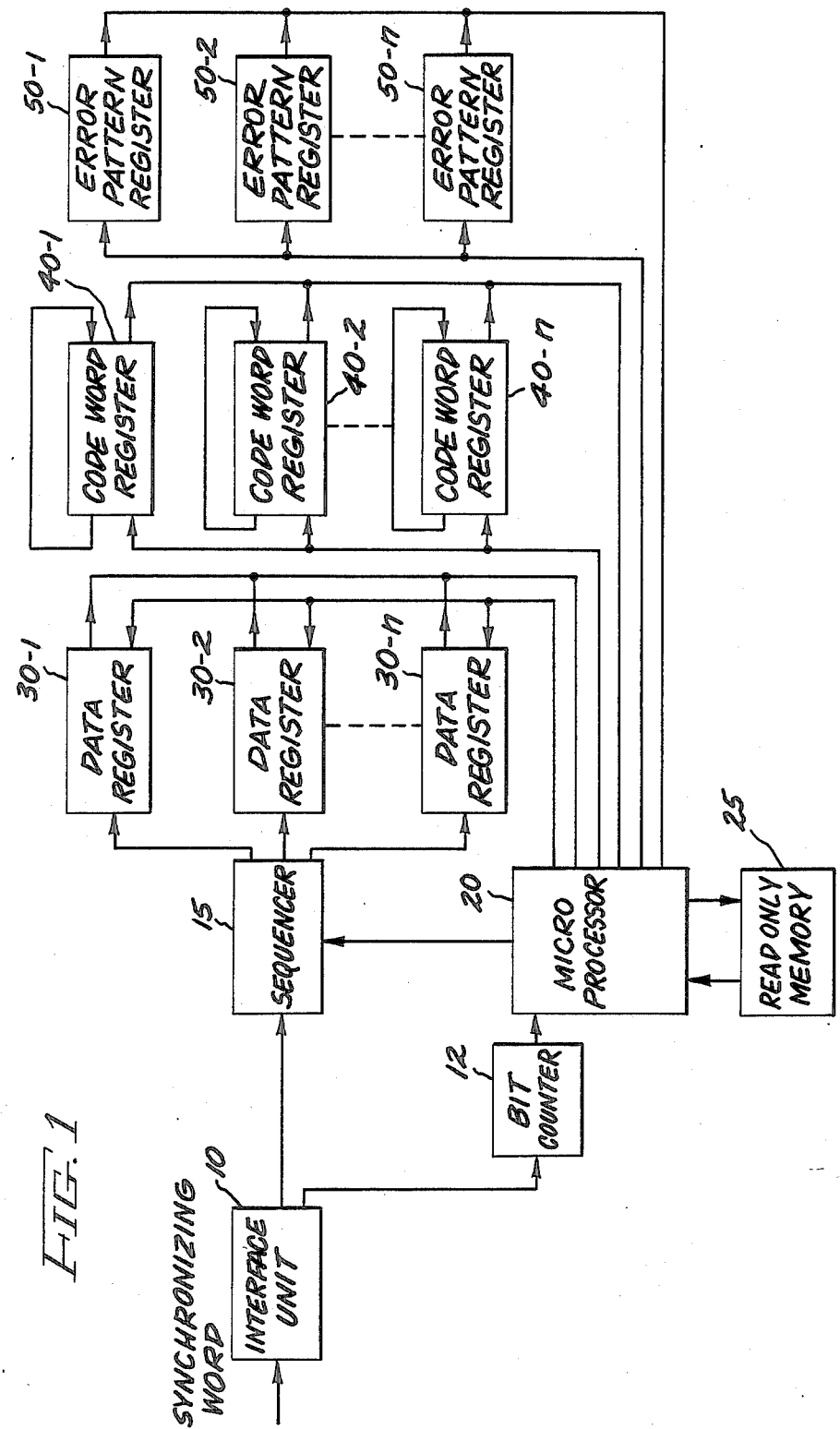
FIG. 1 is a block diagram of a receiver in accordance with the present invention.

Referring to FIG. 1, a block diagram of a receiver useful with the present invention is shown. The receiver comprises an interface unit 10, a bit counter 12, and a sequencer 15. Bit counter 12 and sequencer 15 include a respective input coupled to a respective output of interface unit 10 for receiving a conditioned synchronizing word signal. Typically, interface unit 10 will include coupling means and a modem for obtaining the synchronizing word from a transmission medium and for conditioning the synchronizing word to be compatible with receiver circuitry respectively, as is known in the art.

The receiver further comprises a microprocessor 20, including an output connected to sequencer 15 for providing timing signals thereto, and an input and output coupled to a respective input and output of a read only memory (ROM) 25. ROM 25 has stored therein predetermined code words, as is explained in detail in the aforementioned U.S. Pat. 4,648,901. Microprocessor 20 may comprise a type 8051 integrated circuit, or the like, manufactured by Intel, which includes a ROM. If the integrated circuit selected does not include a ROM then one may be provided, as is known in the art.

The receiver additionally comprises a plurality of data registers 30-1 through 30-n, a plurality of code word registers 40-1 through 40-n, and a plurality of error pattern registers 50-1 through 50-n. Each data register 30 has a corresponding respective code word register 40 and a corresponding respective error pattern register 50 associated therewith to form a tracking decoder, as is described in the above-identified copending application. A respective output of sequencer 15 is respectively coupled to an input of each data register 30-1 through 30-n in order to supply appropriate bits of the synchronizing word thereto. Another output of microprocessor 20 is coupled to an input of sequencer 15 for providing timing signals thereto. Sequencer 15 functions as a steering device wherein each serial bit of the synchronizing word is directed to appropriate data register 30-1 through 30-n. Bits of the synchronizing word are directed by sequencer 15 under control of microprocessor 20 such that any bit interleaving or other bit combination performed at the transmitter (not shown) prior to transmission is undone so that only bits associated with a single code word will be directed to each respective data register 30-1 through 30-n.

Code word registers 40-1 through 40-n, respectively, and error pattern registers 50-1 through 50-n, respectively, each include an input and an output respectively coupled to an output and an input of microprocessor 20. Operation and interaction of code word registers 40-1 through 40-n, error pattern registers 50-1 through 50-n, and data registers 30-1 through 30-n are explained in detail in copending application Ser. No. 627,328.

Briefly, as each bit of a synchronizing word is received, it is steered into an appropriate data register 30-1 through 30-n by sequencer 15 under control of microprocessor 20. Generally, there are required as many data registers 30-1 through 30-n as there are independent code words used to form the synchronizing word. In a preferred embodiment, five Golay (24,12) code words are interleaved to form the synchronizing word, and thus five data registers 30-1 through 30-n along with five associated code word registers 40-1 through 40-n and error pattern registers 50-1 through 50-n (i.e., n=5) are required. Each data register is updated when a bit from the synchronizing word is directed thereto, the new contents thereof are compared with the contents of the respectively associated code word register, and the contents of the respectively associated code word register are updated using an appropriate predetermined code word register are updated using an appropriate predetermined code word stored in ROM 25, as described in the above-identified copending application. Thus, by using pseudo-random data words, which are encoded to generate associated code words, and interleaving the code words to form a synchronizing word, precise bit and message synchronization can be obtained at a receiver even when the synchronizing word is corrupted.

A method in accordance with the present invention comprises implementing an encoding and decoding scheme, wherein a suitable forward error correction code is used to encode a set of pseudo-random information sequences. These sequences are selected to have many 0-1 and 1-0 transitions in order to facilitate establishing and maintaining bit synchronization. The encoded set of sequences is transmitted, preferably in an interleaved manner to reduce the effect of burst errors, to form a synchronizing word. Bit synchronization includes distinguishing at what instant the boundary between consecutively received bits occurs. If using broadband transmission, i.e., modulated carrier, bit synchronization permits the receiver local oscillator source to be locked into synchronization with the transmitter local oscillator source.

In order to establish message synchronization, the receiver first attempts to obtain bit synchronization using transitions in the received synchronizing word. Once bit synchronization has been achieved, the receiver shifts each received bit into one of a plurality of data storage areas or registers. The number of data registers required is equal to the number of encoded sequences used to construct the synchronizing word. The plurality of data registers parses the received set of sequences in order to undo interleaving, if it was performed at the transmitter, and separately stores each received sequence. For each data register, there is a corresponding code word register for storing a code word having the smallest Hamming distance from the contents of the corresponding data register and a corresponding error pattern register for use as a scratch pad. As each bit is received, the contents of the data register in which the received bit is placed and those of the corresponding code word register are updated. A decoding method and apparatus applicable with the present invention for updating the data and code word registers is disclosed in aforementioned U.S. Pat. No. 4,648,901.

After storing each received bit in a respective data register and updating the corresponding code word register, the data portion of the code word register (the contents of the code word register comprises a data portion containing a pseudo-random sequence and a redundancy portion) is compared with the last of the predetermined set of pseudo-random sequences which form the synchronizing word. If they do not correspond exactly, the receiver waits for the next bit to arrive. If they do correspond exactly, the data portion of the code word corresponding to the last received bit is compared with the penultimate pseudo-random sequence. Comparison proceeds until a point is reached when all message portions identically compare with predetermined corresponding pseudo-random sequences. Exact bit-by-bit correspondence over the entire set of predetermined pseudo-random sequences indicates the point of message synchronization to the receiver. Subsequently, this type of comparison can be employed by the receiver, to check if it is synchronized, whenever a synchronizing word is received. The process can also be used by the receiver to re-acquire synchronization whenever the receiver determines loss of synchronization has occurred.

In an exemplary embodiment of the present invention, the synchronizing word has a length of 120 bits and contains a predetermined 60-bit data portion of interleaved pseudo-random sequences followed by 60 corresponding interleaved Golay redundancy bits of a Golay (24,12) code word for each sequence. Thus, the synchronizing word comprises five Golay (24,12) code words, wherein each Golay (24,12) code word includes 12 data bits and 12 redundancy bits.

Figures 2A, 2B, 2C:
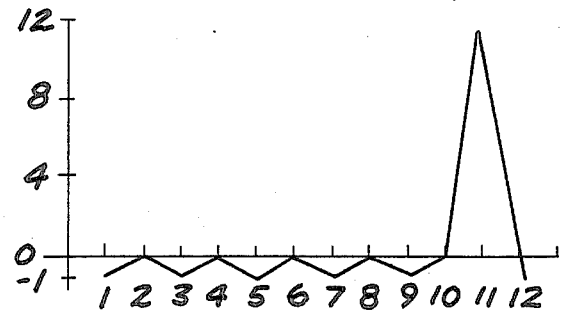
FIGS. 2A through 2C are diagrams of an exemplary pseudo-random code and associated auto-correlation characteristics.

An 11-bit pseudo-random sequence plus a 12th even parity bit form a basic pseudo-random data word. An appropriate 12-bit sequence and its complement, e.g., 111000100101 and 000111011010, respectively, are shown in FIG. 2A. The auto-correlation function of the 12-bit sequence, for which each bit-match with the reference sequence is counted +1 and each bit-mismatch is counted −1, is shown in FIG. 2B. This selection for the basic predetermined data word message is optimal for application with the present invention because of the sharp peak of +11 obtained when an 11-bit matched condition exists. The peak may be used for deriving precise message timing for determining message synchronization at remote receiver units.

Further, selection of a 12-bit basic data word permits an extended Golay (24,12) code word to be generated therefrom. An extended Golay (24,12) code is a forward error correcting code which permits up to three bit values in the 24-bit code word to be corrected if they are detected as being incorrectly received. This enables more accurate message synchronization to be performed when applied according to the teachings of the present invention.

The auto-correlation function of FIG. 2B is obtained for a pseudo-random sequence in the clear, i.e., no bits preceding nor following it. The progression of correlation values (output Σ), as a sequence is received one bit at a time, moves toward an exact match with reference sequence as is shown in FIG. 2C.

Twelve bits are needed for the basic data word if an extended Golay (24,12) code is to be used. The 12th bit is selected to provide even parity so that the correlation value plunges to −1 on the 12th shift as shown in FIG. 2C. The 12th bit may be selected to provide odd parity; however, this generates a correlation value of +1 at the 12th shift, a slightly less advantageous condition.

A 60-bit data field permits using five basic data words in construction of the synchronizing word. As illustrated in FIG. 3A, these data words are interlaced and are alternately complemented. Alternate basic data word sequences are complemented in order to provide a pilot transmission having many 0 to 1 and 1 to 0 bit transitions in order to facilitate deriving bit synchronization at the receiver. For clarity in identifying the five individual sequences, the bits are staggered vertically in FIG. 3A.

Message synchronization may be derived on the basis of a unanimous or majority logic upon determining correlation peaks of +11 on five successive bits (for example, bits #51 through #55 of FIG. 3A), when the pseudo-random sequences are fully received. It is very unlikely that errors will occur in just the right sequence to cause simultaneous, false, full-amplitude correlation peaks in all or even a majority of the five sequences and thus cause message synchronization to be determined at the wrong time by a receiver.

Corresponding Golay redundancy bits for the five pseudo-random sequences in the data field (bits #1 to #60) of the synchronizing word occupy bits #61 to #120 of the synchronizing word and are shown in FIG. 3B. Again, these are staggered to better expose their association with the five corresponding pseudo-random data words.

Thus has been illustrated and described a method and apparatus for obtaining reliable synchronization between a transmitter and a receiver over a noisy communication channel.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for synchronizing a transmitter and a receiver in a synchronous serial transmission communication system comprising the steps of:
   serially transmitting a plurality of sync words encoded as code words of a forward error correction code, said works being transmitted in an interlaced fashion, corresponding bits of each word being transmitted in sequence,
   directing received bits of said sync words int different registers for processing, each register containing bits corresponding to a different word,
   decoding said sync words to provide decoded words; and
   detecting by correlating techniques correspondence between a preselected number of said decoded words and a known reference to thereby establish synchronization between said receiver and said transmitter.

2. The method of claim 1 wherein the step of serially transmitting comprises alternately transmitting the complement of said sync word.

3. The method of claim 2 wherein said decoding step comprises generating an updated decoded word corresponding to received synchronous words on a received bit-by-bit basis.

4. The method of claim 3 wherein said synchronous word is selected to be pseudo-random in character and relatively high in transitions between transmitted states.

5. The method of claim 1 further including the steps of beginning and terminating the transmission of encoded data with said sync words in order to delineate the beginning and end of a data stream.

6. The apparatus for synchronizing a transmitter and a receiver in a synchronous serial transmission communication system comprising:
   means for serially transmitting a plurality of sync words encoded as code words of a forward error correction code, said words being transmitted in an interlaced fashion, corresponding bits of each word being transmitted in sequence,
   a plurality of data registers,
   means for directing received bits of said sync words into different of said registers for processing, each register containing bits corresponding to a different word,
   means for decoding said sync words to provide decoded words; and
   correlation means for detecting the correspondence between a preselected number of said decoded words and a known reference to thereby establish synchronization between said receiver and said transmitter.

7. The apparatus method of claim 6 further including means for alternately transmitting the complement of said sync word.

8. The apparatus of claim 7 wherein said means for decoding comprises means for generating an updated decoded word corresponding to received synch words on a received bit-by-bit basis.

9. The apparatus of claim 8 wherein said sync word is selected to be pseudo-random in character and relat high in transitions between transmitted states.

10. The apparatus of claim 9 wherein said transmitting means includes means for transmitting encoded data intermediate said sync words to delineate the beginning and end of said data.

11. A method of synchronizing a transmitter and a receiver in a synchronous serial transmission system comprising the steps of:

transmitting with each message block a sync work encoded as a code word of the forward error correction code being employed for the message block;

decoding said sync word at the receiver to provide a decoded sync word; and comparing said decoded sync word with a known reference to establish synchronization between said transmitter and receiver.

12. The method of claim 11 wherein said transmitting step comprises:

transmitting said sync word in the form of a plurality of subwords, each subword being a codeword of said forward error correction code, said subword being transmitted in interlaced fashion and wherein said decoding step comprises de-interlacing said sync work to reform and decode each of said subwords.

13. The method of claim 12 further including the step of processing said decoded sync word at said receiver by correlation techniques to detect correspondence between said reformed sync word and a known reference, said correspondence serving to establish synchronization between the receiver and transmitter.

* * * * *